United States Patent
Yuan

(10) Patent No.: US 10,760,819 B2
(45) Date of Patent: Sep. 1, 2020

(54) WATER SUPPLY SYSTEM THAT IS SELECTIVELY SUPPLIED WITH HEATED WATER

(71) Applicant: CANADAVFD CORP(LTD.), Ottawa (CA)

(72) Inventor: Defang Yuan, Ottawa (CA)

(73) Assignee: CANADAVFD CORP (LTD), Ottawa (CA)

(*) Notice: Subject to any disclaimer, the term of this patent is extended or adjusted under 35 U.S.C. 154(b) by 115 days.

(21) Appl. No.: 15/955,847

(22) Filed: Apr. 18, 2018

(65) Prior Publication Data

US 2018/0306463 A1    Oct. 25, 2018

Related U.S. Application Data

(60) Provisional application No. 62/488,292, filed on Apr. 21, 2017.

(51) Int. Cl.
| | |
|---|---|
| F24H 1/12 | (2006.01) |
| F24H 1/44 | (2006.01) |
| F24H 1/00 | (2006.01) |
| F24H 1/10 | (2006.01) |
| G05D 23/13 | (2006.01) |
| F24H 1/18 | (2006.01) |
| F24H 9/12 | (2006.01) |
| F16K 31/04 | (2006.01) |

(52) U.S. Cl.
CPC .............. *F24H 1/44* (2013.01); *F16K 31/046* (2013.01); *F24H 1/0018* (2013.01); *F24H 1/105* (2013.01); *F24H 1/182* (2013.01); *F24H 1/185* (2013.01); *F24H 9/126* (2013.01); *G05D 23/134* (2013.01); *G05D 23/1393* (2013.01)

(58) Field of Classification Search
CPC .......... F24C 13/00; F24D 3/082; F24H 1/125
See application file for complete search history.

(56) References Cited

U.S. PATENT DOCUMENTS

| | | | | |
|---|---|---|---|---|
| 2,285,998 | A  * | 6/1942  | Morrison | F24D 3/082 |
| | | | | 165/132 |
| 4,975,560 | A  * | 12/1990 | Wardy | C23F 13/02 |
| | | | | 204/196.05 |
| 8,919,296 | B2 * | 12/2014 | Komori | F24D 3/082 |
| | | | | 122/19.1 |
| 9,244,466 | B2 * | 1/2016  | Duplessis | G05D 23/132 |
| 9,458,035 | B1 * | 10/2016 | Lesage | A01N 59/16 |
| 9,726,443 | B2 * | 8/2017  | Parbs | F28F 27/02 |
| 9,879,867 | B2 * | 1/2018  | Sugimura | F24D 3/10 |
| 9,897,343 | B2 * | 2/2018  | Matsuzawa | F24D 19/1069 |

(Continued)

*Primary Examiner* — Gregory A Wilson
(74) *Attorney, Agent, or Firm* — Faegre Drinker Biddle & Reath LLP

(57) ABSTRACT

Disclosed is a water supply system that conditionally fills with heated water. The water supply system has a water tank configured to store and supply heated water, a heater configured to heat water in the water tank, and a sensor configured to sense a temperature of the water in the water tank. In accordance with an embodiment of the disclosure, the water supply system has a water supply unit configured to selectively supply heated water or unheated water to the water tank based on the temperature that has been sensed. In some implementations, this is performed to reduce use of the heated water, which may result in energy savings.

17 Claims, 7 Drawing Sheets

(56) References Cited

U.S. PATENT DOCUMENTS

| | | | |
|---|---|---|---|
| 2011/0305444 A1* | 12/2011 | Pussell | F24D 17/0031 |
| | | | 392/308 |
| 2012/0192965 A1* | 8/2012 | Popper | E03B 7/04 |
| | | | 137/357 |
| 2013/0266295 A1* | 10/2013 | Kreutzman | F24H 9/1818 |
| | | | 392/308 |
| 2018/0347830 A1* | 12/2018 | Callahan | F24D 17/0078 |

* cited by examiner

WATER SUPPLY SYSTEM THAT IS SELECTIVELY SUPPLIED WITH HEATED WATER

CROSS-REFERENCE TO RELATED APPLICATIONS

This application claims priority to U.S. Application No. 62/488,292, filed Apr. 21, 2017, which is incorporated herein by reference in its entirety.

FIELD OF THE DISCLOSURE

This disclosure relates to water supply systems, and more particularly to water supply systems that provide heated water in a prompt manner.

BACKGROUND

According to conventional water supply systems, when a person wants to use hot water from a point-of-use (e.g. faucet tap), the person may need to wait about 45 seconds before water coming out of the point-of-use becomes hot. This is because there may be cold water in a water pipe between a water heater that heats the water and the point-of-use, and hot water can reach the point-of-use only after the cold water in the water pipe is replaced by the hot water.

There are three main disadvantages of the conventional water supply systems. Firstly, it may take about 45 seconds to wait for the hot water to come out of the point-of-use. Secondly, each time a person waits for the hot water to come out of the point-of-use, there may be about 4 L of water that is wasted. Thirdly, the water pipe heats up from the hot water running through the water pipe only to cool down after use, which results in wasted heating energy by the water heater.

A household with a family of three people using a conventional water supply system might for example spend a total of 46 hours in a year waiting for hot water, which may waste 14,600 L of water and 238 kWh of energy for the year. Thus, it is clear that conventional water supply systems have drawbacks.

An existing approach is to use a hot water circulation pump to accelerate the speed of hot water supply to the point-of-use, or use a circulation pump to maintain a higher water temperature in the water pipe in order to reduce the time spent waiting for the hot water. Compared to the conventional water supply systems, the hot water circulation pump saves water. However, this does not avoid wasting heating energy because the water pipe is heated only to lose heat to its surroundings.

Another existing approach is to install an instant water heater at the point-of-use. However, the instant water heater uses a power supply that must be very powerful to quickly heat up water. For example, the power supply may need to deliver more than 3 kW. Additional electric wire installation may be needed when using electricity, or gas pipes may need to be installed when using gas.

Another existing approach is to install a hot water tank at the point-of-use. However, to physically fit the hot water tank at the point-of-use (e.g. under a sink in a bathroom), the hot water tank may be relatively small, which may limit a capacity of hot water that can be delivered. Thus, the hot water tank may not be able to provide hot water for a long period of time or for frequent uses.

SUMMARY OF THE DISCLOSURE

Disclosed is a water supply system, which in some implementations may solve or mitigate the above problems.

The water supply system has a water tank configured to store and supply heated water, a heater configured to heat water in the water tank, and a sensor configured to sense a temperature of the water in the water tank. In accordance with an embodiment of the disclosure, the water supply system has a water supply unit configured to selectively supply heated water or unheated water to the water tank based on the temperature that has been sensed.

In some implementations, the water supply unit performs the selection to reduce use of the heated water, which may result in energy savings. Also, by promptly supplying hot water from the water tank during water use, the amount of time spent waiting for hot water as well as the amount of water that is wasted while waiting can be reduced or eliminated.

The water supply system can be used in conjunction with a main water heater and can be installed at a point-of-use. No additional electric wiring or gas pipe installing are required. In some implementations, for a household with a family of three people, the water supply system may use 262 kWh of heat energy during a year, and may save up to 14,600 L water and 238 kWh of energy during the year. Some implementations enable the water supply system to supply hot water promptly and continuously even if the water use is frequent and/or prolonged.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Water Supply System

Figure 1:
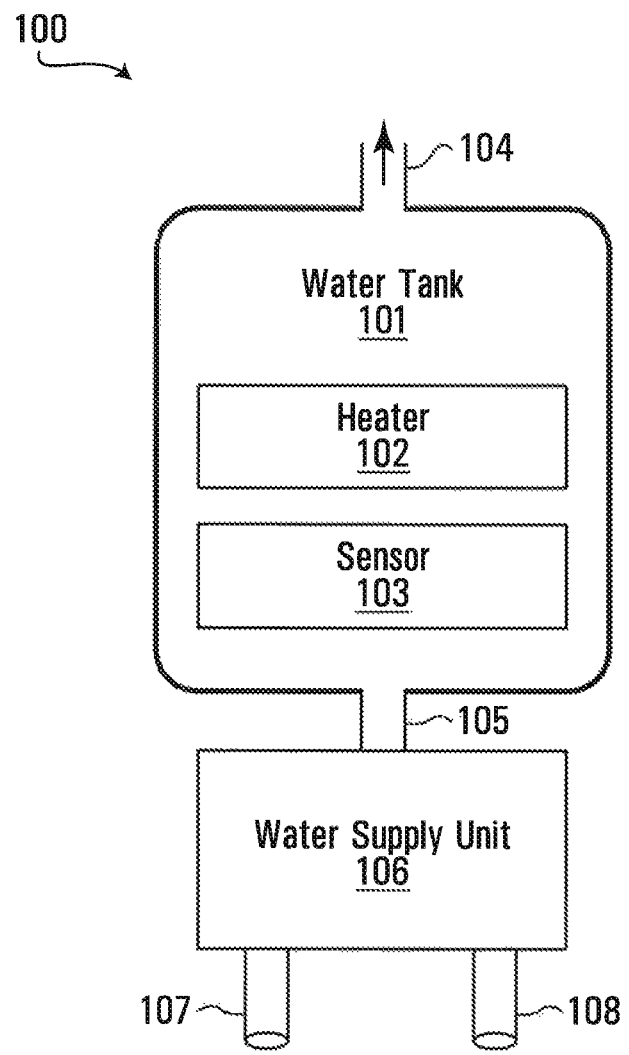
FIG. 1 is a block diagram of a water supply system.

Referring first to FIG. 1, shown is a block diagram of a water supply system 100. The water supply system 100 has a water tank 101, a heater 102, a sensor 103, a water supply unit 106, and may have other components that are not shown. In some implementations, the heater 102 and the sensor 103 are part of the water tank 101 as shown in FIG.

1. In other implementations, the heater 102 and the sensor 103 are separate from the water tank 101.

Operation of the water supply system 100 will now be described by way of example. The water tank 101 is configured to store and supply heated water. The heater 102 is configured to heat water in the water tank 101. The water tank 101 has an outlet 104 for supplying water during water use (e.g. hand washing). The sensor 103 is configured to sense a temperature of the water in the water tank 101.

According to an embodiment of the disclosure, the water supply unit 106 is configured to selectively supply heated water or unheated water to the water tank 101 based on the temperature that has been sensed. In some implementations, the water supply unit 106 receives the heated water through a hot water inlet 107, receives the unheated water through a cold water inlet 108, and selectively supplies the heated water or the unheated water to the water tank 101 through an inlet 105 of the water tank 101.

In some implementations, the water supply unit 106 performs the selection to reduce use of the heated water from the hot water inlet 107. In some implementations, the water supply unit 106 favours water flow from the cold water inlet 108 when the temperature of the water in the water tank 101 is at least the predefined threshold. By favoring water flow from the cold water inlet 108 when the temperature of the water in the water tank 101 is at least the predefined threshold as described above, it is possible to reduce the frequency of using water from the hot water inlet 107. As explained in further detail below with reference to FIGS. 2A and 2B, this may result in energy savings. Also, by promptly supplying hot water from the water tank 101 during water use, the amount of time spent waiting for hot water as well as the amount of water that is wasted while waiting for hot water can be reduced or eliminated.

In some implementations, the inlet 105 of the water tank 101 is a single inlet as shown in FIG. 1. In other implementations, the inlet 105 is a plurality of inlets. In specific implementations, the inlet 105 includes a first inlet for receiving heated water (when selected by the water supply unit 106) and a second inlet for receiving unheated water (when selected by the water supply unit 106). Other implementations are possible.

In some implementations, the water supply unit 106 includes a switch (not shown) configured to switch between (1) supplying unheated water to the water tank 101 when the temperature that has been sensed is at least a predefined threshold, and (2) supplying heated water to the water tank when the temperature that has been sensed is below the predefined threshold. In some implementations, the switch (not shown) is a solenoid valve coupled to the hot water inlet 107 and the cold water inlet 108. An example of this is described below with reference to FIGS. 2A and 2B. However, other switches are possible as described below with reference to FIGS. 5 and 6.

In other implementations, the water supply unit 106 enables water flow from both the hot water inlet 107 and the cold water inlet 108 and at the same time. For example, in some implementations, rather than receiving 100% of water from the hot water inlet 107 and 0% of water from the cold water inlet 108 when the temperature of the water in the water tank 101 is below the predefined threshold, the water tank 101 instead receives 95% of water from the hot water inlet 107 and 5% of water from the cold water inlet 108. As another example, in some implementations, rather than receiving 0% of water from the hot water inlet 107 and 100% of water from the cold water inlet 108 when the temperature of the water in the water tank 101 is at least the predefined threshold, the water tank 101 instead receives 5% of water from the hot water inlet 107 and 95% of water from the cold water inlet 108. In some implementations, the proportion of the water received from hot water inlet 107 and the proportion of the water received from cold water inlet 108 is a function of the temperature of the water in the water tank 101. In some implementations, linear control elements, which are usually used in industrial control, are used to provide the "proportional control" for the water supply unit 106. Other implementations are possible.

In some implementations, the water supply system 100 is installed in a household to supply water to a point-of-use (not shown) such as a faucet tap for example. In such implementations, the outlet 104 of the water tank 101 can be connected to the point-of-use (not shown) either directly or indirectly through one or more intervening components (not shown). Furthermore, the hot water inlet 107 can be connected to a hot water pipe that supplies water from a main water heater (not shown), and the cold water inlet 108 can be connected to a cold water pipe that supplies water that has not been heated by the main water heater (not shown).

Although embodiments of the disclosure focus on installations in households, installations in other buildings such as commercial buildings for example may be possible depending on how the water supply system 100 is used and the volume of hot water pipes leading to the water supply system 100.

Another Water Supply System

Figure 2A:
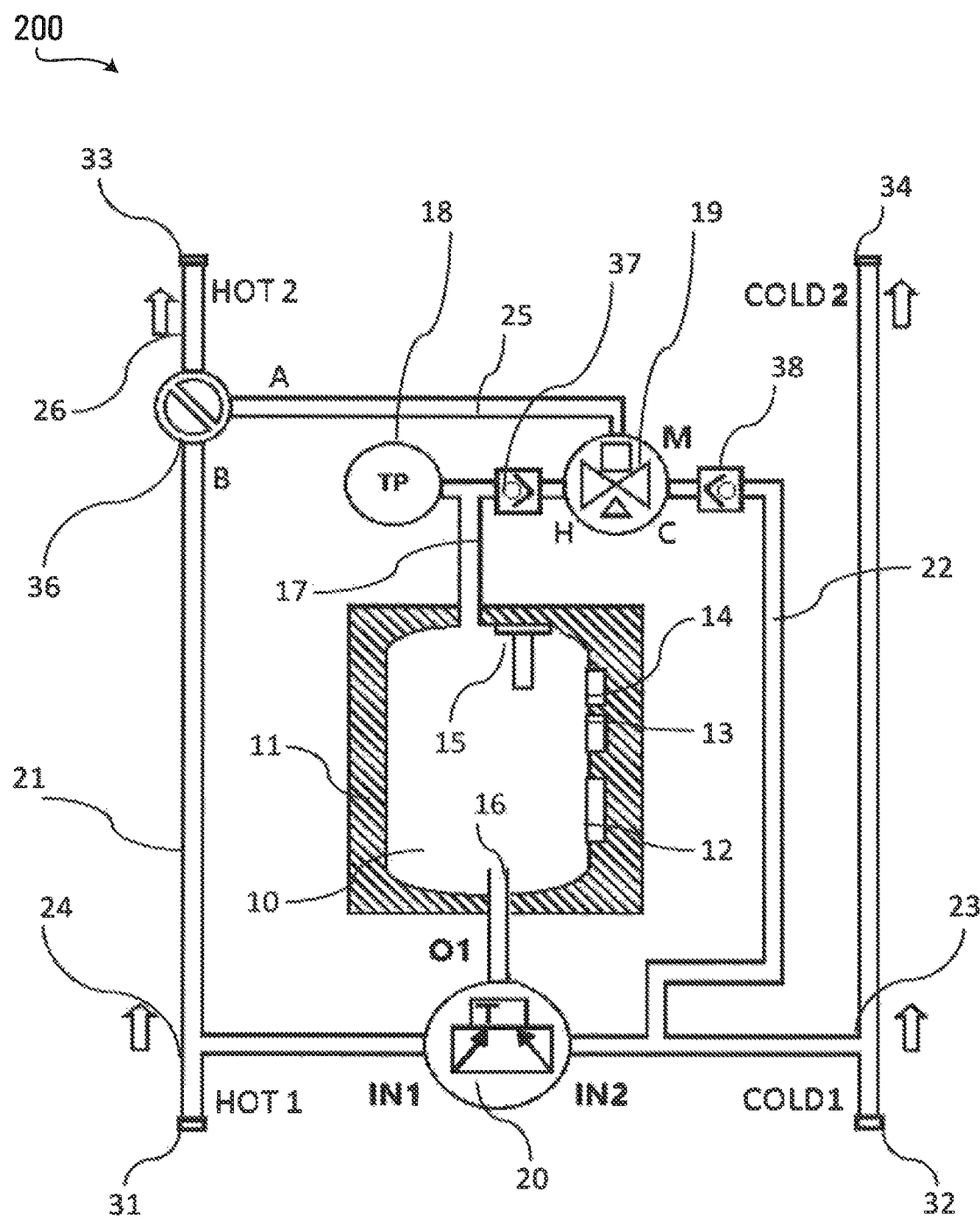
FIG. 2A is a block diagram of another water supply system.
Figure 2B:
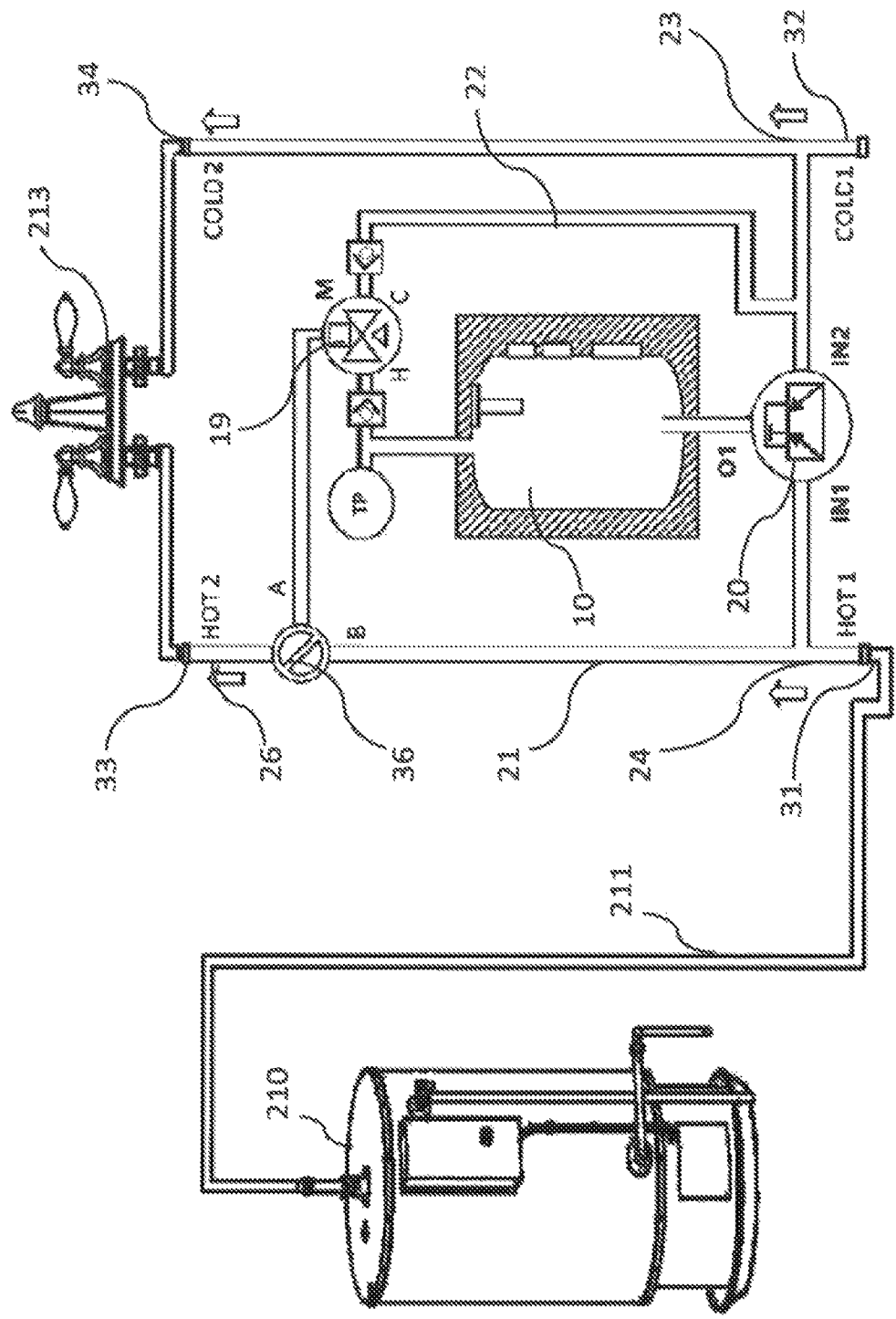
FIG. 2B is a block diagram of the water supply system connected to a main water heater and a faucet.

Referring now to FIG. 2A, shown is a block diagram of another water supply system 200. In some implementations, the water supply system 200 is installed in a household to supply water to a point-of-use such as a faucet tap for example. To illustrate this point, with reference to FIG. 2B, shown is a block diagram of the water supply system 200 connected to a main water heater 210 and a faucet 213 of a household. While the water supply system 200 is shown to be connected to the faucet 213 for a sink in this example, other applications (e.g. faucet for a shower head) are possible and are within the scope of the disclosure. Furthermore, as noted above with reference to FIG. 1, installations in other buildings such as commercial buildings for example may be possible.

The water supply system 200 has four pipe connectors 31, 32, 33, 34 including a hot water inlet 31 that connects to a hot water pipe 211, a cold water inlet 32 that connects to an existing cold water pipe (not shown), a hot water outlet 33 that connects to a hot water inlet of the faucet 213, and a cold water outlet 34 that connects to a cold water inlet of the faucet 213. With reference to FIG. 2B, installation of the water supply system 200 involves connecting these four pipe connectors 31, 32, 33, 34.

The water supply system 200 has a water tank 10, which has an electric heater 12 configured to heat water in the water tank 10 and to maintain the water at a target temperature. In some implementations, the target temperature is 70° C. However, other target temperatures are possible and are within the scope of this disclosure. In some implementations, as shown in FIG. 2A, the water tank 10 has a heater controller 13 for over-temperature protection of the electric heater 12.

In some implementations, the electric heater 12 is controlled in the following logic: if the temperature of the water in the water tank 10 is high, for example at 70° C., the electric heater 12 maintains the temperature of the water in the water tank 10 with a lower power. If the temperature of the water in the water tank 10 is low, for example, at 40° C., the electric heater 12 heats the water with a higher power.

During water use, water from the water tank 10 leaves through a pipe 17 and makes its way to the faucet 213. At the same time, used water is replaced in the water tank 10 with water from the hot water inlet 31 and/or the cold water inlet 32. In some implementations, this replacing occurs such that a volume of water in the water tank 10 remains substantially constant. In specific implementations, the water tank 10 remains substantially full of water during water use. Whenever an amount of water leaves the water tank 10, a corresponding amount of water enters the water tank 10. In some implementations, the movement of water in the water supply system 200 is based on water pressure.

In some implementations, the water supply system 200 has a temperature regulator configured to mix an amount of water from the cold water inlet 32 into the water supplied from the water tank 10 to produce mixed water having a regulated temperature. The regulated temperature can be chosen so as to avoid any burning of skin by water that is too hot. In some implementations, the regulated temperature is anywhere between 45° C. to 49° C. In some implementations, the thermostatic mixing valve 19 ensures that the temperature of the water flowing out from the pipe 25 is not higher than 49° C. However, other regulated temperatures are possible and are within the scope of this disclosure.

FIGS. 2A and 2B depict a specific configuration for a temperature regulator in which a thermostatic mixing valve 19 is implemented. The thermostatic mixing valve 19 has an H-side as a hot water inlet, a C-side as a cold water inlet, and a water outlet connected to an outlet pipe 25. Hot water from the pipe 17 mixes with the cold water from the pipe 22 by the thermostatic mixing valve 19, and flows to the outlet pipe 25. Furthermore, to avoid backwards water flow and crossover water flow in the thermostatic mixing valve 19, there is a first check valve 37 coupled between the water tank 10 and the thermostatic mixing valve 19, and a second check valve 38 coupled between the cold water inlet 32 and the thermostatic mixing valve 19. Other configurations for a temperature regulator are possible and are within the scope of the disclosure.

A solenoid valve 20 is installed at an inlet pipe 16 of the water tank 10. In accordance with an embodiment of the disclosure, the solenoid valve 20 conditionally conducts water from either a cold water pipe 23 that is connected to the cold water inlet 32, or a hot water pipe 24 that is connected to the hot water inlet 31, based on a temperature of the water in the water tank 10. In particular, when the temperature of the water in the water tank 10 is at least a predefined threshold, the solenoid valve 20 conducts water from the cold water pipe 23. However, when the temperature of water in the water tank 10 is below the predefined threshold, the solenoid valve 20 conducts water from the hot water pipe 24. In some implementations, the predefined threshold is between 5° C. to 15° C. less than the target temperature. In some implementations, the predefined threshold is 60° C. with the target temperature being 70° C. However, other predefined thresholds are possible and are within the scope of this disclosure.

The conduction actions of the solenoid valve 20 are achieved by sensing the temperature of the water in the water tank 10 and comparing the temperature of the water against the predefined threshold. In some implementations, as shown in FIG. 2A, the water tank 10 has a switch controller 14, which controls water source selection of the solenoid valve 20 based on the temperature of the water in the water tank 10. In some implementations, the switch controller 14 has a sensor configured to sense a temperature of the water in the water tank 10. In this regard, the switch controller 14 is a thermostat, which senses and controls at the same time. In other implementations, the sensor is separate from the switch controller 14.

By conditionally conducting water from either the cold water pipe 23 or the hot water pipe 24 according to the temperature of the water in the water tank 10 as described above, it is possible to reduce the frequency of heating up the hot water pipe 211 between the main water heater 210 and the water supply system 200 as well as the hot water pipe 24 of the water supply system 200. This may avoid wasting heating energy by the main water heater 210. In particular, the water supply system 200 may reduce the frequency at which the hot water pipe 211 and the hot water pipe 24 are heated during water use only to lose heat to its surroundings. Reducing use of the hot water pipe 24 and the hot water pipe 211 will be explained in further detail below by way of example.

In a first example, the capacity of the water tank 10 is 4 L, the temperature of the water in the water tank starts at the target temperature of 70° C., and 2 L hot water is consumed by a user for hand washing. When the user initially consumes hot water using the facet 213, the thermostatic mixing valve 19 mixes cold water into water supplied from the water tank 10 because the water in the water tank is 70° C., which is above the regulated temperature of 49° C. Meanwhile, the solenoid valve 20 conducts water from the cold water pipe 23 because the temperature of the water in the water tank is 70° C., which is above the predefined threshold of 60° C. The temperature of the water in the water tank 10 decreases as the solenoid valve 20 conducts water from the cold water pipe 23. Consequently, the thermostatic mixing valve 19 can decrease the amount of cold water being mixed into the water supplied from the water tank 10 to achieve the regulated temperature of 49° C. Given that the user is consuming only 2 L of hot water, and given that the water tank 10 does not supply all of the 2 L due to the thermostatic mixing valve 19 mixing in cold water, the temperature of the water in the water tank 10 does not decrease below the predefined threshold of 60° C. in this example. As such, the solenoid valve 20 conducts water from only the cold water pipe 23. When the user has finished with the hand washing and turns off the faucet, water from the cold water pipe 23 stops flowing into the water tank 10, and the water in the water tank 10 is heated back towards the target temperature of 70° C. to prepare for subsequent use.

In a second example, the capacity of the water tank 10 is 4 L, the temperature of the water in the water tank starts at the target temperature of 70° C., and 6 L hot water is consumed by a user for hand washing. When the user initially consumes hot water using the facet 213, the thermostatic mixing valve 19 mixes cold water into water supplied from the water tank 10 because the water in the water tank is 70° C., which is above the regulated temperature of 49° C. Meanwhile, the solenoid valve 20 conducts water from the cold water pipe 23 because the temperature of the water in the water tank is 70° C., which is above the predefined threshold of 60° C. The temperature of the water in the water tank 10 decreases as the solenoid valve 20 conducts water from the cold water pipe 23. Consequently, the thermostatic mixing valve 19 can decrease the amount of cold water being mixed into the water supplied from the water tank 10 to achieve the regulated temperature of 49° C. Given that the user is consuming 6 L of hot water, the temperature of the water in the water tank 10 decreases below the predefined threshold of 60° C. in this example. Once this happens, the solenoid valve 20 switches to conducting water from the hot water pipe 24. The temperature of the water in the water tank 10 may continue to decrease for a limited duration because the water from the hot water pipe 24 may be initially cold. This is because there may be cold water in the hot water pipe 211 connected to the main water heater 210, and hot water can reach the water tank 10 only after the cold water in the hot water pipe 211 is replaced by the hot water. However, in this example the temperature of the water in the water tank 10 does not go below 50° C. thereby ensuring that the user is supplied with hot water for the entire duration of washing their hands. The temperature of the water in the water tank 10 soon recovers and increases as the hot water is received from the main water heater 210. When the user has finished with the hand washing and turns off the faucet, water from the hot water pipe 24 stops flowing into the water tank 10, and the water in the water tank 10 is heated towards the target temperature of 70° C. to prepare for subsequent use.

The first example demonstrates how water from the water pipe 24 is not used at all when the user consumes only 2 L of hot water for hand washing. However, when the user consumes 6 L of hot water for hand washing, water from the water pipe 24 is used after the temperature of the water in the water tank 10 falls below the predefined threshold. In the first example, there may be energy savings compared to conventional water supply systems because the water supply system 200 avoids heating the water pipe 211 only to lose heat to its surroundings. Thus, heating energy from the main water heater 210 is avoided. The second example may not achieve the same benefit, but water from the water pipe 24 is used in a manner that may ensure that the user receives hot water throughout the entire time that the user is washing their hands.

The water supply system 200 can be retrofitted to a conventional water supply system in which a point-of-use receives unheated water from a water line and heated water from a main water heater via a hot water pipe (e.g. water pipe 211). The foregoing examples demonstrate that the water supply system 200 can avoid using the water pipe 211 under certain situations, which may result in energy savings compared to the conventional water supply system. Also, the water supply system 200 circumvents any need for a powerful heater to quickly heat up cold water. This is because the water tank 10 holds heated water for use and, in the event that more hot water is needed than the water tank 10 can provide, the water tank 10 receives hot water from the water pipe 211.

Notably, the water tank 10 has a relatively small capacity and is smaller than the main water heater 210. However, in some implementations, the water tank 10 is large enough to adequately provide hot water to the faucet 213 during water use (e.g. washing hands) even if the water use is frequent and/or prolonged such as in the second example described above. In some implementations, the capacity of the water tank 10 is between 3 L to 12 L. However, other capacities are possible and are within the scope of this disclosure.

In some implementations, a capacity V of the water tank 10 is determined by a water volume W in the pipes between the main water heater 210 and the point-of-use. In some implementations, the water supply system 200 can supply hot water promptly and continuously when the capacity of the water tank V is in between about 2 and 3 times of W. An example relationship between V and W can be described as
$2W \leq V \leq 3W$.

When V is larger, system performance may improve, but the cost in making the system may also increase. The example relationship is an approximation provided as a guideline only. For example, the capacity of the water tank V can certainly be designed to be larger than three times the water volume W in the pipes at an increased cost.

When the water supply system 200 is installed far away from the main water heater 210, the water volume W in the pipes between the main water heater 210 and the point-of-use may be relatively high in which case the capacity V of the water tank 10 can be chosen to be relatively high to maintain the ratio described above. Furthermore, to accommodate the capacity V of the water tank 10, the electric heater 12 may be chosen to have relatively high power. Thus, in some implementations, the distance between the water supply system 200 and the main water heater 210 is a consideration in designing the capacity V of the water tank 10 and the heating power of the electric heater 12.

In some implementations, the water supply system 200 is installed in a vicinity of the point-of-use (e.g. faucet 213). For example, in some implementations, the water supply system 200 is installed under a sink corresponding to the faucet 213. By having the water supply system 200 installed close to the point-of-use, the volume of water in the pipes between the water tank 10 and the point-of-use can be relatively low and even negligible. Thus, during water use, there may be very little or even negligible delay until heated water from the water tank 10 comes out of the faucet 213.

In other implementations, the water supply system 200 is installed at another location that is not in a vicinity of the point-of-use. In such implementations, the volume of water in the pipes between the water tank 10 and the point-of-use may be substantial, which may result in some delay until heated water from the water tank 10 comes out of the faucet 213. In some implementations, the water supply system 200 is installed at a location such that a ratio of the volume of water in the pipes between the water tank 10 and the point-of-use to the volume of water in the pipes between the main water heater 210 and the water supply system 200 is reduced as much as practicable.

While the water supply system 200 is connected to a single point-of-use (e.g. faucet 213) in FIG. 2B, in other implementations the water supply system 200 is connected to a plurality of points-of-use. In some implementations, the capacity of the water tank 10 and the heating power are chosen to be relatively high to accommodate the plurality of points-of-use. In such implementations, the capacity of the water tank 10 may exceed the relationship between V and W described above.

In some implementations, as shown in FIGS. 2A and 2B, the water supply system 200 has a bypass valve 36 configured to switch between enabling the mixed water to flow to an output during the water use, and enabling water flow to the output from only the hot water inlet thereby bypassing the water tank 10 and the temperature regulator. In some implementations, the switching valve 36 is a manually operated valve. Generally, when the water supply system 200 is in normal operation, the bypass valve 36 enables conduction between the pipe 26 and the pipe 25, as shown position A in FIG. 2A. When the system is faulty, the switching valve 36 can be switched to conduct water to the pipe 26 from the pipe 21, as shown position B in FIG. 2A. In this manner, the water supply is switched to a hot-cold water supply.

In some implementations, as shown in FIGS. 2A and 2B, the water supply system 200 has a temperature-pressure relief valve 18 installed on the outlet pipe 17 of the water tank 10, The temperature-pressure relief valve 18 is configured to open to outside air if temperature or pressure within the water tank 10 exceeds predefined safe values. In some implementations, the predefined safe values are 150 PSI and 99° C. This may ensures that the temperature and the pressure inside the water tank 10 are within safe ranges. Other implementations are possible in which no temperature-pressure relief valve 18 is present.

In some implementations, as shown in FIGS. 2A and 2B, the water tank 10 has an anode protection element 15 for protecting the water tank 10 from corrosion. Other implementations are possible in which no anode protection element 15 is present.

In some implementations, as shown in FIGS. 2A and 2B, the water tank 10 has a thermal insulation layer 11 configured to reduce heat energy dissipation from the water tank 10. In some implementations, the thermal insulation layer 11 is used as a covering shell of the water tank 10, at least 50 mm in thickness, in order to reduce the heat energy dissipation. Other implementations are possible.

Wiring Diagrams

Figure 3:
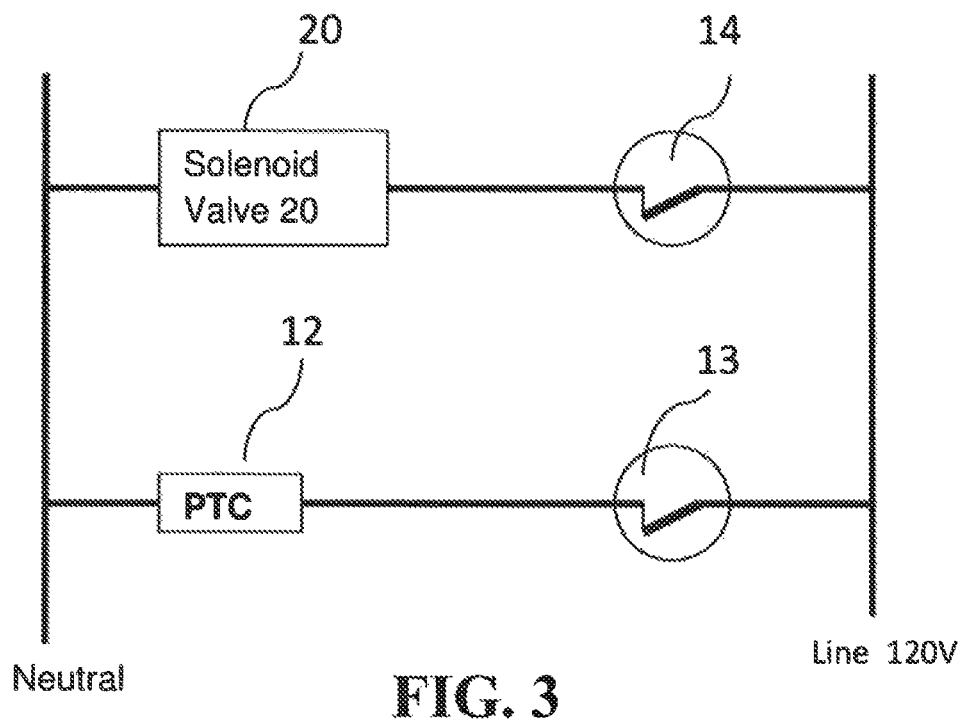
FIGS. 3 and 4 are wiring diagrams of control circuits for the water supply system of FIG. 2A according to varying embodiments.
Figure 4:
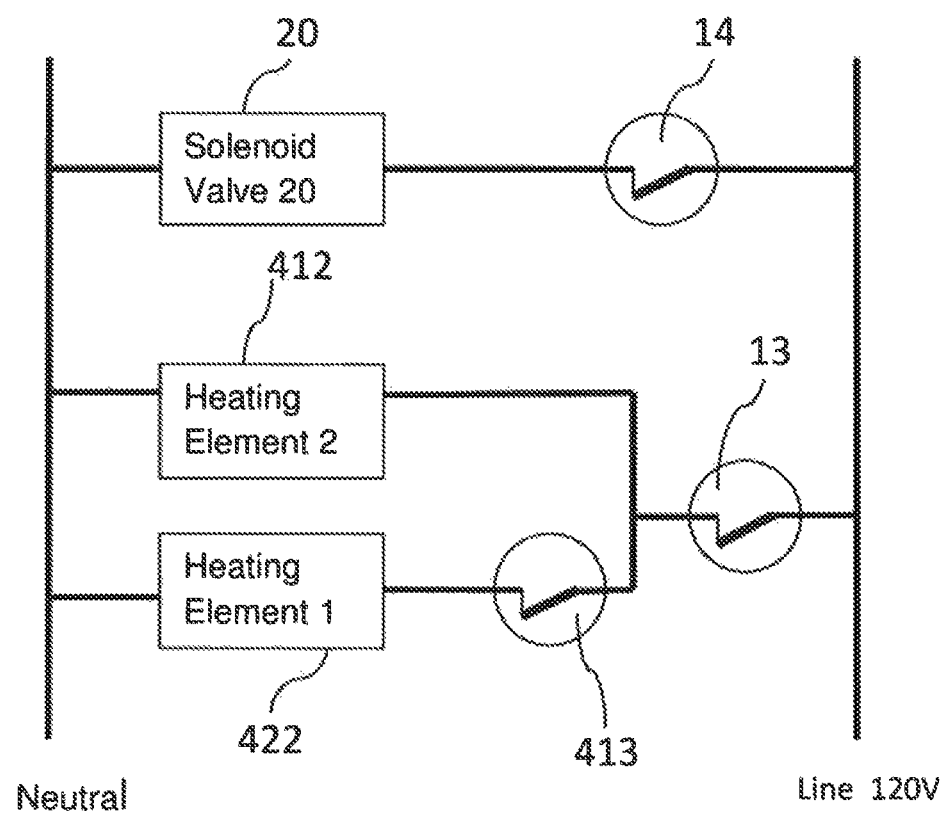

Referring now to FIGS. 3 and 4, shown are wiring diagrams of control circuits for the water supply system of FIG. 2A according to varying embodiments. The wiring diagrams show electrical components being powered with a voltage of 120V AC. However, other power sources are possible and are within the scope of the disclosure. For example, in other implementations, the electrical components are powered with a voltage of 240V AC.

There are many possibilities for the electric heater 12. In some implementations, the electric heater 12 is a PTC (Positive Temperature Coefficient) element 12 as shown in FIG. 3. In other implementations, the electric heater 12 is replaced with a first heating element 422 and a second heating element 412 combined with a secondary controller 413 as shown in FIG. 4. Other implementations are possible.

According to FIG. 3, the PTC element 12 is a temperature-self-regulated heating element. When the temperature is low, the equivalent resistance of PTC is lower and the heating power is higher. When the temperature is high, the equivalent resistance of the PTC element 12 is higher and the heating power is lower. Therefore, the PTC element 12 automatically regulates the temperature. In some implementations, the PTC element 12 has a regulating temperature set to 70° C. In some implementations, by using the PTC element 12 to heat water in the water tank 10, the temperature of the water in the water tank has a target temperature of 70° C. Other target temperatures are possible and are within the scope of the disclosure.

In some implementations of the embodiment of FIG. 3, the heater controller 13 works as over-temperature protection. In this regard, a temperature setting of the heater controller 13 is higher than the regulated temperature of the PTC element 12. For example, in some implementations, the heater controller 13 is set at 75° C. while the PTC element 12 is set at 70° C. Thus, when the temperature of the water tank 10 reaches 75° C. or higher, the heater controller 13 turns OFF, and consequently the PTC element 12 is turned OFF. Usually, if the PTC element 12 is set at 70° C., the heater controller 13 is always ON under normal operation because the temperature of the water in the water tank 10 is lower than 75° C.

According to FIG. 4, the second heating element 412 is a relatively low power element, for example 30 W, which is used to maintain the temperature of the water in the water tank 10. However, the first heating element 422 is a relatively high power element, for example 500 W, which is used to heat the water in the water tank 10. The secondary controller 413 is used to control the water temperature, and can be set at a target temperature, for example 70° C. The secondary controller 413 turns OFF when the temperature of the water in the water tank 10 is higher than 70° C. and turns ON when temperature of the water in the water tank 10 is lower than 70° C., thereby enabling the first heating element 422 to heat the water. Other target temperatures are possible and are within the scope of the disclosure.

When the temperature of the water in the water tank 10 is lower than 70° C., the first heating element 422 and the second heating element 412 work together to heat the water in the water tank 10. When the temperature of the water in the water tank 10 reaches 70° C., the secondary controller 413 turns OFF and consequently the first heating element 422 is turned OFF. At this point, only the second heating element 412 is still energized to maintain the temperature of the water in the water tank 10. In some implementations, this ensures that the temperature of the water in the water tank 10 is around 70° C.

In some implementations of the embodiment of FIG. 4, the heater controller 13 works as over-temperature protection. In this regard, a temperature setting of the heater controller 13 is higher than the regulated temperature of the secondary controller 413. For example, in some implementations, the heater controller 13 is set at 75° C. while the secondary controller 413 is set at 70° C. Thus, if the temperature of the water in the water tank 10 reaches 75° C. or higher, the heater controller 13 turns OFF, and consequently both the first heating element 422 and the second heating element 412 are turned OFF. In some implementations, this ensures that the temperature of the water in the water tank 10 never exceeds 75° C. Usually, if the secondary controller 413 is set at 70° C., the heater controller 13 is always ON under normal operation because the temperature of the water in the water tank 10 is lower than 75° C.

According to the embodiments of FIGS. 3 and 4, the solenoid valve 20, which is installed at the water inlet pipe 16, has two states. A first state connects IN1 with O1 and disconnects IN2 from O1 (i.e. conducts water from IN1 to O1 and disconnects IN2 with O1). A second state connects IN2 with O1 and disconnects IN1 with O1 (i.e. conducts water from IN2 to O1 and disconnects IN1 with O1). At any time, only one of IN1 and IN2 can be conducted to O1. This means the water flows into the water tank 10 either comes from hot water pipe 24 or cold water pipe 23.

The state of the solenoid valve 20 is controlled by the switch controller 14 according to the temperature of the water in the water tank 10. In particular, switch controller 14 gives control actions at a threshold temperature T1. When the temperature of the water in the water tank 10 is higher than the threshold temperature T1, which means there is sufficient hot water in the water tank 10, the switch controller 14 controls the solenoid valve 20 to conduct the water from the cold water pipe 23. Thus, the water in pipe 23 flows into the water tank 10. The hot water in the main water heater 210 is not required at this time. However, when the temperature of the water in the water tank 10 is lower than the threshold temperature T1, which means there is not sufficient hot water in the water tank 10, the hot water from the main water heater 210 is to be used. Thus, the switch controller 14 controls the solenoid valve 20 to conduct water from the hot water pipe 24. Accordingly, the water from pipe 211 and 24 flows into the water tank 10.

There are many possibilities for the threshold temperature T1. In some implementations, the threshold temperature T1 is set to ensure that the temperature of the water in the water tank 10 remains high enough to supply hot water to the point-of-use before the hot water in primary hot heater reaches the water tank 10. In the embodiment of FIG. 3, the threshold temperature T1 is set to be lower than the target temperature of the PTC element 12. In the embodiment of FIG. 4, the threshold temperature T1 is set to be lower than the target temperature of the secondary controller 413. At the same time, for both embodiments, the threshold temperature T1 is set to be higher than the regulated temperature of the thermostatic mixing valve 19. In some implementations, this design minimizes or reduces the use of the hot water from the main water heater 210, and minimizes or reduces the frequency of filling up the pipes 211 and 24 with hot water.

For example, in some implementations, the threshold temperature T1 is set to 60° C. Thus, when the temperature of the water in the water tank 10 is higher than 60° C., the switch controller 14 controls the solenoid valve 20 to conduct water from the cold water pipe 23 to the pipe 16. In other words, IN2 and O1 are connected and the hot water pipe 24 is disconnected, and only the cold water from pipe 23 flows into the water tank 10 through the solenoid valve 20 and the pipe 16 because the hot water in the pipe 24 is blocked. Conversely, when the temperature of the water in the water tank 10 is lower than 60° C., the switch controller 14 controls the solenoid valve 20 to conduct water from the hot water pipe 24 to the pipe 16. In other words, IN1 and O1 are connected and the cold water pipe 23 is disconnected, and only the hot water from the main water heater 210 flows into the water tank 10 from the pipes 211 and 24 through the solenoid valve 20 because cold water in the pipe 23 is blocked.

The heating power of the PTC element 12 (FIG. 3) and the first heating element 422 and the second heating element 412 (FIG. 4) are not directly related to the time delay and the temperature of hot water supply in the water supply system 200. Thus, the heating power of the PTC element 12 (FIG. 3) and the first heating element 422 and the second heating element 412 (FIG. 4) are much lower than a tankless water heater or an ordinary household hot water tank. For example, the heating power of the PTC element 12 (FIG. 3) or the first heating element 422 (FIG. 4) can be 500 W or even as low as 300 W. The heating power of the second heating element 412 (FIG. 4) can be as low as 30 w to only maintain the temperature of the water in the water tank 10. In contrast, in a tankless water heater, the heating power is higher than 3 kW, and in an ordinary household hot water tank, the heating power is higher than 700 W.

Although embodiments of the disclosure focus on electrical implementations for various components such as the electric heater 12 for example, it is to be understood that non-electrical implementations may be possible. In other implementations, electrical components are replaced with non-electrical components. For example, a heater that uses an exothermic chemical reaction to generate heat can be used instead of an electric heater. For instance, a heater that burns gas to generate heat can be used instead of an electric heater. Other implementations are possible.

Other Water Supply Systems

Although FIGS. 2A and 2B depict the water supply system 200 having a solenoid valve 20, as noted above, other implementations are possible. For example, the solenoid valve 20 can be replaced by any electric-activated valve with two inlets and one outlet. Example varying implementations are described below.

Figure 5:
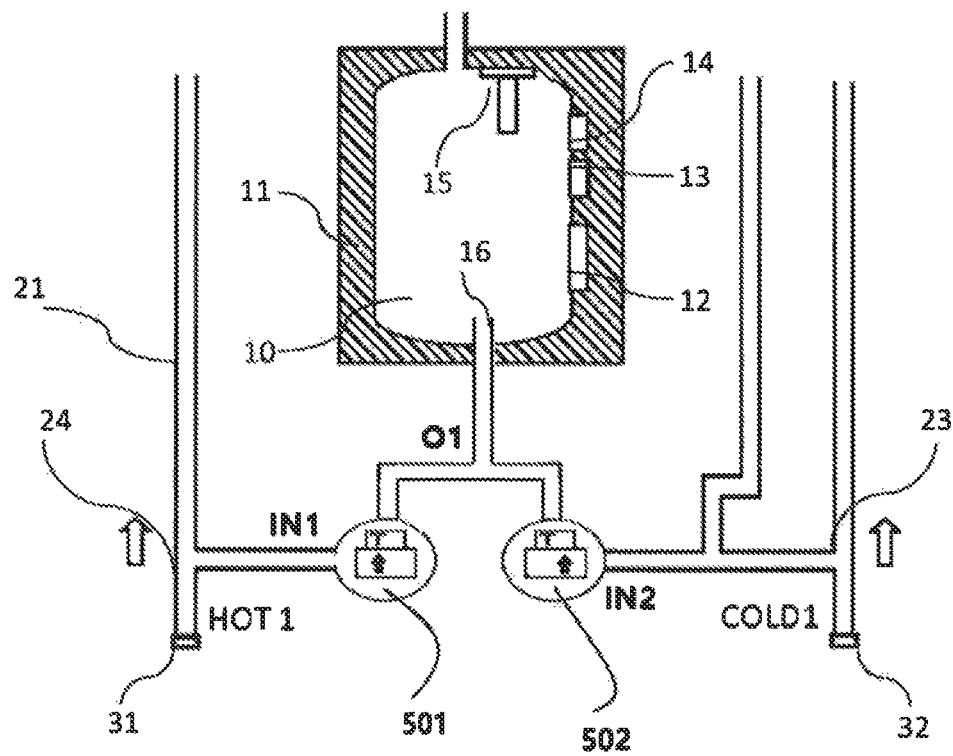
FIGS. 5 and 6 are block diagrams of other water supply systems.
Figure 6:
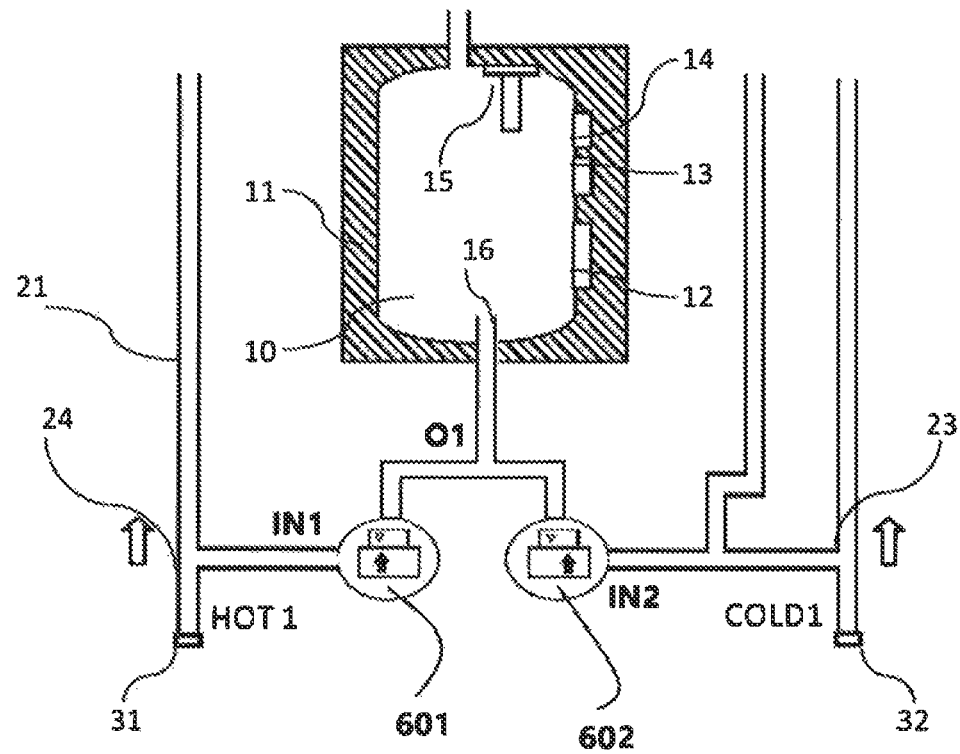

Referring now to FIGS. 5 and 6, shown are block diagrams of other water supply systems. These water supply systems are substantially identical to the water supply system 200 of FIGS. 2A and 2B. However, the water supply systems of FIGS. 5 and 6 show varying implementations in which the solenoid valve 20 of FIGS. 2A and 2B is replaced by other components.

According to FIG. 5, the solenoid valve 20 of FIGS. 2A and 2B is replaced by two electric-activated valves 501 and 502. The two electric-activated valves 501 and 502 include a first valve 501 conducting the water from the pipe 24 to the pipe 16, and a second valve 502 conducting the water from the pipe 23 to the pipe 16. The two electric-activated valves 501 and 502 are both controlled by the switch controller 14. The two electric-activated valves 501 and 502 conduct water alternatively (i.e. they do not conduct at the same time).

According to FIG. 6, the solenoid valve 20 of FIGS. 2A and 2B is replaced with two mechanic-switched water valves 601 and 602. The two mechanic-switched water valves 601 and 602 include a first valve 601 conducting the water from the pipe 24 to the pipe 16, and a second valve 602 conducting the water from the pipe 23 to the pipe 16. The two mechanic-switched water valves 601 and 602 are both controlled by the switch controller 14. The two mechanic-switched water valves 601 and 602 are conducting water alternatively (i.e. they do not conduct at the same time).

Method for Supplying Water

Figure 7:
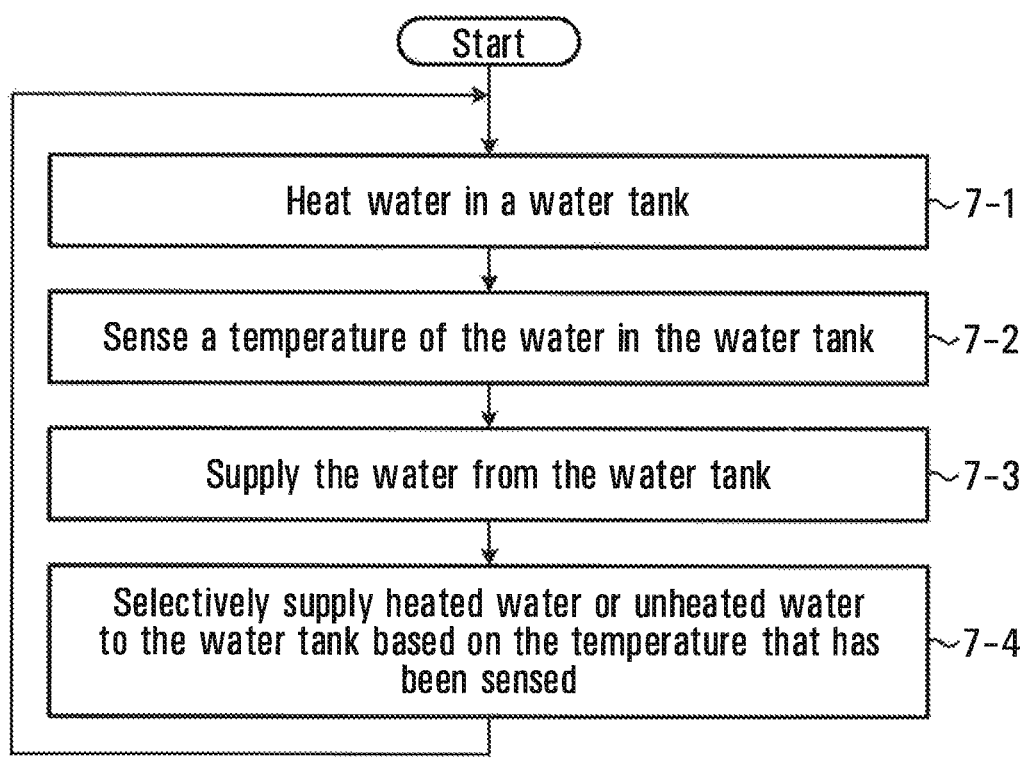
FIGS. 7 and 8 are flowcharts of methods for supplying water.
Figure 8:
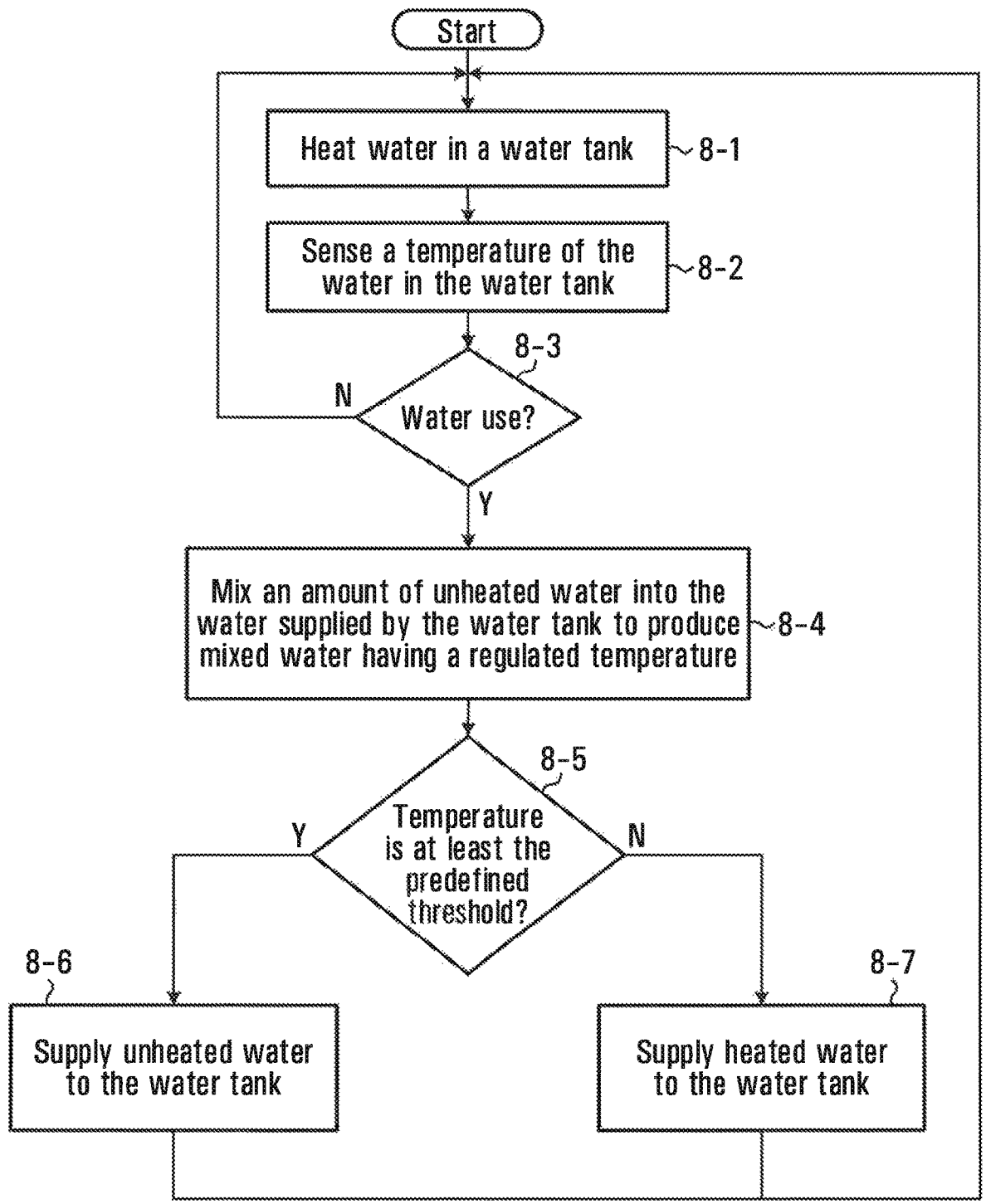

Referring now to FIGS. 7 and 8, shown are flowcharts of methods for supplying water. These methods may be executed by a water supply system, for example the water supply system 100 shown in FIG. 1, the water supply system 200 shown in FIGS. 2A and 2B, or any other appropriately configured water supply system. Although the flowcharts depict steps being executed in sequence, it is to be understood that some steps may be executed concurrently or in an alternative order to that shown.

Referring first to FIG. 7, at step 7-1 the water supply system heats water in a water tank. At step 7-2, the water supply system supplies the water from the water tank during water use. At step 7-3, the water supply system senses a temperature of the water in the water tank. At step 7-4, the water supply system selectively supplies heated water or unheated water to the water tank based on the temperature that has been sensed.

There are many ways for selectively supplying heated water or unheated water to the water tank based on the temperature that has been sensed. In some implementations, the water supply system favours supply of unheated water when the temperature of the water in the water tank is at least the predefined threshold. This may avoid wasting heating energy as explained above with reference to FIGS. 2A and 2B.

In specific implementations, the water supply system switches between (1) supplying unheated water to the water tank when the temperature that has been sensed is at least a predefined threshold, and (2) supplying heated water to the water tank when the temperature that has been sensed is below the predefined threshold. An example of this is described below with reference to FIG. 8.

Referring now to FIG. 8, at step 8-1 the water supply system heats water in a water tank. At step 8-2, the water supply system senses a temperature of the water in the water tank. If at step 8-3 the water supply system is supplying the water during water use (e.g. hand washing), then at step 8-4 the water supply system mixes an amount of unheated water into the water supplied by the water tank to produce mixed water having a regulated temperature.

Meanwhile, if at step 8-5 the temperature of the water in the water tank is at least the predefined threshold, then at step 8-6 the water supply system supplies unheated water to the water tank. However, if at step 8-5 the temperature of the water in the water tank is less than the predefined threshold, then at step 8-6 the water supply system supplies heated water to the water tank.

In this manner, the water supply system favours supply of unheated water when the temperature of the water in the water tank is at least the predefined threshold. This may avoid wasting heating energy as explained above with reference to FIGS. 2A and 2B.

Kit for Retrofitting an Existing Water Supply System

According to another embodiment of the disclosure, there is provided a kit for retrofitting an existing water supply system in which a point-of-use receives unheated water from a water line and heated water from a main water heater via a hot water pipe. The kit has a water tank configured to store and supply heated water to the point-of-use, a heater configured to heat water in the water tank, and a sensor configured to sense a temperature of the water in the water tank. According to an embodiment, the kit also has a water supply unit configured to selectively supply heated water from the hot water pipe or unheated water from the water line to the water tank based on the temperature that has been sensed.

Numerous modifications and variations of the present disclosure are possible in light of the above teachings. It is therefore to be understood that within the scope of the appended claims, the disclosure may be practised otherwise than as specifically described herein.

We claim:

1. A water supply system, comprising:
  a water tank configured to store and supply heated water;
  a heater configured to heat water in the water tank;
  a sensor configured to sense a temperature of the water in the water tank; and
  a water supply unit configured to selectively supply heated water or unheated water to the water tank based on the temperature that has been sensed;
  a temperature regulator configured to mix an amount of unheated water into the heated water supplied by the water tank to produce mixed water having a regulated temperature;
  a bypass valve configured to switch between:
  enabling the mixed water to flow to an output for water use; and
  enabling heated water to flow to the output from a hot water source thereby bypassing the water tank and the temperature regulator.

2. The water supply system of claim 1, wherein the water supply unit further comprises a switch configured to switch between:
  supplying unheated water to the water tank when the temperature that has been sensed is at least a predefined threshold; and
  supplying heated water to the water tank when the temperature that has been sensed is below the predefined threshold.

3. The water supply system of claim 2, wherein the switch further comprises a solenoid valve.

4. The water supply system of claim 2, wherein the water supply system further comprises:
  a switch controller configured to control the switch based on the temperature that has been sensed.

5. The water supply system of claim 2, further comprising:
  a heater controller configured to control the heater to heat the water in the water tank to a target temperature;
  wherein the predefined threshold is between 5° C. to 15° C. less than the target temperature.

6. The water supply system of claim 1, wherein the temperature regulator further comprises a thermostatic mixing valve.

7. The water supply system of claim 1, wherein the water tank further comprises:
  an anode protection element for protecting the water tank from corrosion.

8. The water supply system of claim 1, further comprising:
  a thermal insulation layer configured to reduce heat energy dissipation from the water tank.

9. A water supply system, comprising:
  a water tank configured to store and supply heated water;
  a heater configured to heat water in the water tank;
  a sensor configured to sense a temperature of the water in the water tank; and
  a water supply unit configured to selectively supply heated water or unheated water to the water tank based on the temperature that has been sensed;
  a temperature regulator configured to mix an amount of unheated water into the heated water supplied by the water tank to produce mixed water having a regulated temperature;
  a temperature-pressure relief valve coupled to the water tank;
  wherein the temperature-pressure relief valve is configured to open to outside air if temperature or pressure within the water tank exceed predefined safe values.

10. The water supply system of claim 9, wherein the water supply unit further comprises a switch configured to switch between:
  supplying unheated water to the water tank when the temperature that has been sensed is at least a predefined threshold; and
  supplying heated water to the water tank when the temperature that has been sensed is below the predefined threshold.

11. The water supply system of claim 10, wherein the switch further comprises a solenoid valve.

12. The water supply system of claim 10, wherein the water supply system further comprises:
  a switch controller configured to control the switch based on the temperature that has been sensed.

13. The water supply system of claim 10, further comprising:
  a heater controller configured to control the heater to heat the water in the water tank to a target temperature;
  wherein the predefined threshold is between 5° C. to 15° C. less than the target temperature.

14. The water supply system of claim 9, wherein the temperature regulator further comprises a thermostatic mixing valve.

15. The water supply system of claim 9, wherein the water tank further comprises:
  an anode protection element for protecting the water tank from corrosion.

16. The water supply system of claim 9, further comprising:
  a thermal insulation layer configured to reduce heat energy dissipation from the water tank.

17. A system comprising:
  a water tank configured to store and supply heated water;
  a heater configured to heat water in the water tank;
  a temperature regulator configured to mix an amount of unheated water into the heated water supplied by the water tank to produce mixed water having a regulated temperature;

a point-of-use for delivering the mixed water for water use;
a sensor configured to sense a temperature of the water in the water tank;
a water supply unit configured to selectively supply heated water or unheated water to the water tank based on the temperature that has been sensed;
a main water heater configured to supply the heated water to the water supply unit via a hot water pipe;
a water line configured to supply the unheated water to the water supply unit via a cold water pipe; and
a bypass valve configured to switch between:
  enabling the mixed water to flow to an output for water use; and
  enabling heated water to flow to the output from a main hot water source thereby bypassing the water tank and the temperature regulator.

\* \* \* \* \*